US008259613B2

(12) United States Patent
Cromer et al.

(10) Patent No.: US 8,259,613 B2
(45) Date of Patent: Sep. 4, 2012

(54) AUTONOMIC NETWORK CONNECTIONS

(75) Inventors: Daryl Carvis Cromer, Apex, NC (US);
Philip John Jakes, Durham, NC (US);
Howard Jeffrey Locker, Cary, NC
(US); Raymond Gary Octaviano, II,
Marietta, GA (US)

(73) Assignee: Lenovo (Singapore) Pte. Ltd.,
Singapore (SG)

( * ) Notice: Subject to any disclaimer, the term of this patent is extended or adjusted under 35 U.S.C. 154(b) by 675 days.

(21) Appl. No.: 11/618,727

(22) Filed: Dec. 29, 2006

(65) Prior Publication Data
US 2008/0159132 A1 Jul. 3, 2008

(51) Int. Cl.
*H04L 12/28* (2006.01)
*G06F 15/177* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
(52) U.S. Cl. ........................... 370/254; 709/220
(58) Field of Classification Search .............. None
See application file for complete search history.

(56) References Cited

U.S. PATENT DOCUMENTS

| | | | | |
|---|---|---|---|---|
| 5,497,490 | A * | 3/1996 | Harada et al. | 713/100 |
| 5,557,748 | A * | 9/1996 | Norris | 709/220 |
| 6,711,617 | B1 * | 3/2004 | Bantz et al. | 709/227 |
| 6,922,723 | B1 * | 7/2005 | Sharp et al. | 709/221 |
| 2002/0072391 | A1 * | 6/2002 | Itoh et al. | 455/557 |
| 2003/0022673 | A1 * | 1/2003 | Bantz et al. | 455/456 |
| 2004/0039862 | A1 * | 2/2004 | Hunt et al. | 710/304 |
| 2004/0120278 | A1 * | 6/2004 | Krantz et al. | 370/328 |
| 2007/0115951 | A1 * | 5/2007 | Karaoguz et al. | 370/356 |
| 2007/0130468 | A1 * | 6/2007 | Cunningham et al. | 713/176 |

OTHER PUBLICATIONS

Andrew McMillan, Whereami Documentation, pp. 1-9, Date Unknown.*
Rocco Stanzione, Killer Feature?, Ubuntu Mailing List, Apr. 14, 2006, pp. 1-2.*
"Caius", Mac OS X Hints Forum, Jan. 27, 2005 to Jun. 6, 2006, pp. 1-5.*
Marino Kamp, How to Manage Different Network Environments?, Debian Laptop Mailing List, Oct. 28-30, 2002, pp. 1-23.*
Martin Emrich, Auto Laptop Interfaces, Debian Mailing List, Dec. 13, 2001, pp. 1-4.*

* cited by examiner

*Primary Examiner* — John Blanton
*Assistant Examiner* — Christopher Crutchfield
(74) *Attorney, Agent, or Firm* — Lieberman & Brandsdorfer, LLC

(57) ABSTRACT

A method of selecting a network connection for use with a data processing system includes detecting environmental information indicative of a current environment in which the system is operating, determining whether the current environment is a known environment, and, rapidly selecting a current network connection by identifying a known environment network connection. Detecting environmental information may include detecting time information and detecting whether specified hardware (e.g., docking station, external monitor, printer, external network adapter) is present. The determining may include accessing a network connection data structure containing historical network connection information. The network connection data structure may include a plurality of records, each record identifying an environmental state and a network connection used in conjunction with the respective environmental state. The system may be a laptop system having a dial up modem connection, a wired network interface card (NIC) connection, a wireless connection, and a broadband connection.

16 Claims, 2 Drawing Sheets

| ENTRY | TOD (304) | DOCKING STATION (306) | EXTERNAL MONITOR (308) | PRINTER (310) | EXTERNAL NETWORK DEVICE (312) | | NETWORK CONNECTION (314) |
|---|---|---|---|---|---|---|---|
| 302-1 | | | | | | | |
| 302-2 | | | | | | | |
| | | | | | | | |
| 302-n | | | | | | | |

300

AUTONOMIC NETWORK CONNECTIONS

BACKGROUND

1. Field of Invention

The invention is in the field of data processing systems and networks. More particularly, the invention is in the field of implementing network connections in data processing systems.

2. History of Related Art

Most users of laptop and other types of mobile data processing system are generally familiar with the process of establishing a network connection. Many laptop systems have multiple ports and other forms of hardware with which a network connection can be established. As examples, network connections can be made using a modem, a wired network adapter (Ethernet or Token Ring), a broadband device (DSL, cable modem, or ISDN), or a wireless network adapter (e.g., 802.11g or 802.11b). Typically, it is preferable to communicate with a network using a single type of connection to avoid contention issues. Data processing systems that are operable with multiple types of network connections generally execute a process to select one of the possible network connection types. This network selection process is typically executed automatically when a system is powered on or otherwise reset. Moreover, applications exist to assist user in making connections. The Access Connection application from Lenovo Corporation, for example, enables a user to define and select location profiles. Each location profile stores all of the network and Internet configuration settings that are needed to connect to a network infrastructure from a specific location such as home or work. By switching among location profiles as users move from place to place, users can quickly and easily connect to a network without manually reconfiguring settings or restarting their computers.

Conventional network connection aids, however, still require a user to select a profile. In the absence of a profile selection, the network connection process may take a considerable amount of time to check each type of network connection in some form of prioritized ordering. It would be desirable, therefore, to implement a network connection technique that provides better automation and better performance than conventional network connection aids.

SUMMARY OF THE INVENTION

The objective identified above is addressed by systems and methods for selecting a network connection for use with a data processing system. One such method includes detecting environmental information indicative of a current environment in which the system is operating, determining whether the current environment is a known environment, and, rapidly selecting a current network connection by identifying a known environment network connection. Detecting environmental information may include detecting time information and detecting whether specified hardware (e.g., docking station, external monitor, printer, external network adapter) is present. The determining may include accessing a network connection data structure containing historical network connection information. The network connection data structure may include a plurality of records, each record identifying an environmental state and a network connection used in conjunction with the respective environmental state. The system may be a laptop or portable system having a dial up modem connection, a wired network interface card (NIC) connection, a wireless connection, and a broadband connection.

BRIEF DESCRIPTION OF THE DRAWINGS

Other objects and advantages of the invention will become apparent upon reading the following detailed description and upon reference to the accompanying drawings in which.

Figure 1:
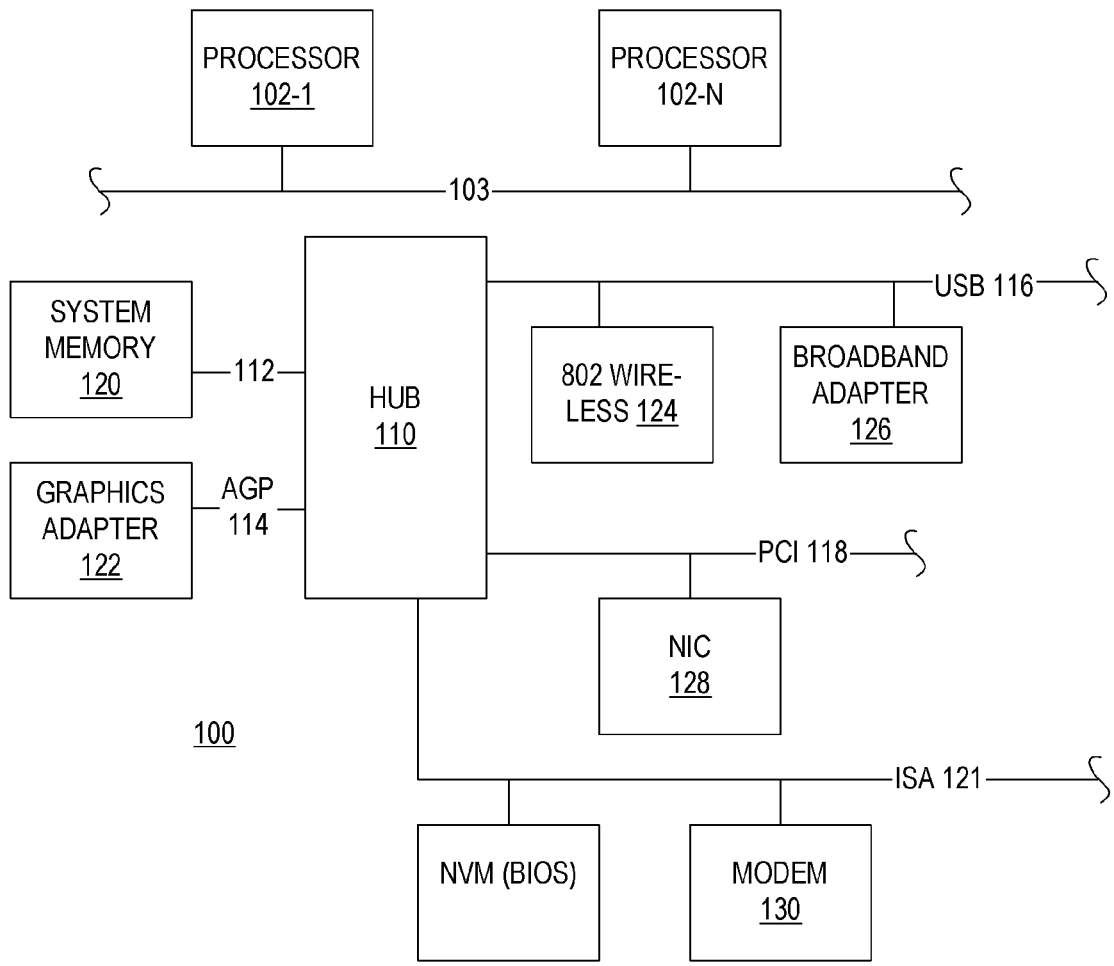
FIG. 1 is a block diagram of selected elements of a data processing system emphasizing a plurality of network connection options.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally disclosed herein are methods and systems designed to select a network connection type in a data processing system having more than one network connection option. The selection of a network connection as disclosed herein is based at least in part and sometimes primarily on "environmental" information about the system. The environmental information refers to any readily determinable information about the environment in which the data processing system is operable. The time of day, for example, may be used as environmental information to assist the network connection selection process. If a user has a history of powering on a data processing in the same office every morning at 8:45 AM, subsequent power on sequences that occur at or near 8:45 AM may reasonably suspect that the user is in the office. The network connection selection process can then identify the network connection that is usually used when the user is in the office. Other environmental information can be incorporated into this technique to provide the selection process with sufficient information to make a "fast" determination of the appropriate network connection when the environmental information indicates that the data processing system is operating in a familiar setting (e.g., using the network connection that was last used in the same environment). If, on the other hand, the environmental information indicates that the user is operating in an unfamiliar environment or context, the selection process may include invoking conventional network connection algorithms, which tend to execute rather slowly.

Referring now to FIG. 1, selected elements of a data processing system suitable for implementing one embodiment of a network selection process are presented. In the depicted embodiment, data processing system 100 includes one or more processors 102-1 through 102-N connected to a system bus 102. A chipset 110 provides a memory controller function for system memory 120 via a memory bus 112 and also provides an advanced graphics port (AGP) 114 for a graphics adapter 122. Other embodiments may implement the memory controller function into one or more of the processors 102. In addition, chipset 110 may include two or more integrated circuits including, as examples a north bridge chip and a south bridge chip as will be familiar to data processing system designers.

Chipset 110 as depicted in FIG. 1, also provides interfaces between system bus 103 and one or more peripheral busses or I/O busses. In the depicted implementation, for example, chipset 110 provides a universal serial bus (USB) 116, a Peripheral Components Interface (PCI or a derivative thereof such as PCI-X, Mini PCI, Cardbus, and PCI Express (which may also be used in lieu of AGP bus 114), and a legacy peripheral bus such as the Industry Standard Architecture (ISA) bus 121.

The embodiment of data processing system 100 as depicted in FIG. 1 includes multiple network connection devices, where a device refers to the hardware, firmware, and drivers needed to implement the device. The devices shown in system 100 include a 802.11-type device or Wi-Fi device 124 and a broadband device adapter 126 connected to USB 116. Broadband device adapter 126 may be, for example, a DSL modem, a cable modem, or an ISDN adapter. A network interface card (NIC) 128 provides a conventional wired connection to a network via PCI bus 118, while a conventional modem 130 on ISA bus 121 provides still another facility for accessing a network. Which network connection is best to use depends, to a large extent, on the environment in which the data processing system is operating. If, for example, the user has a docking station in his or her office with a wired connection to a corporate network, NIC adapter 128 is probably the best (fastest and securest) connection. If, however, the user is in a hotel or other establishment that provides a wireless hotspot, the Wi-Fi adapter 124 may provide the user with the best network access. If the user is in a remote location where a dial up network is the only option, modem 130 should be selected.

Ideally, data processing system 100 selects the best available option for network connection in the shortest possible time. Reducing the time required to make connection using the best available network connection may include making an educated guess about which network connection is best. The network connection selection methods described herein rely to some extent on the observation that many users exhibit predictable or consistent usage patterns. For example, it may well be the case that the user is almost invariable at the office during certain hours of the day and that, when the user is in the office, the best connection available to the user is a NIC connection. Similarly, it may be the case that a user is at home during certain other hours and that, when the user is at home, the best available connection is a Wi-Fi connection. In these cases, one may say that the environmental parameters time of day and physical location provide good indicators of which network connection to select. Moreover, these parameters may be quickly determined. In contrast, conventional algorithmic methods for selecting one of several network connections are relatively complex and slow. Accordingly, the use of environmental information to aid in the network selection process as described herein beneficially results in a network connection selection that is generally much quicker than a conventional technique of blindly walking through an ordered list of available network connections.

Some embodiments of the network connection selection methods are implemented as computer program products. A computer program product for a network connection selection method preferably includes a set of computer executable instructions, stored on a computer readable medium, for selecting the best available network connection. The computer readable storage medium may include system memory, a cache memory (not depicted) of one or more processors 102, or another form of volatile memory. Alternatively, the computer readable storage medium may include a conventional magnetic disk (hard disk), floppy diskette, compact disc (CD), DVD, magnetic tape, or other suitable form of persistent storage.

Figures 2, 3:
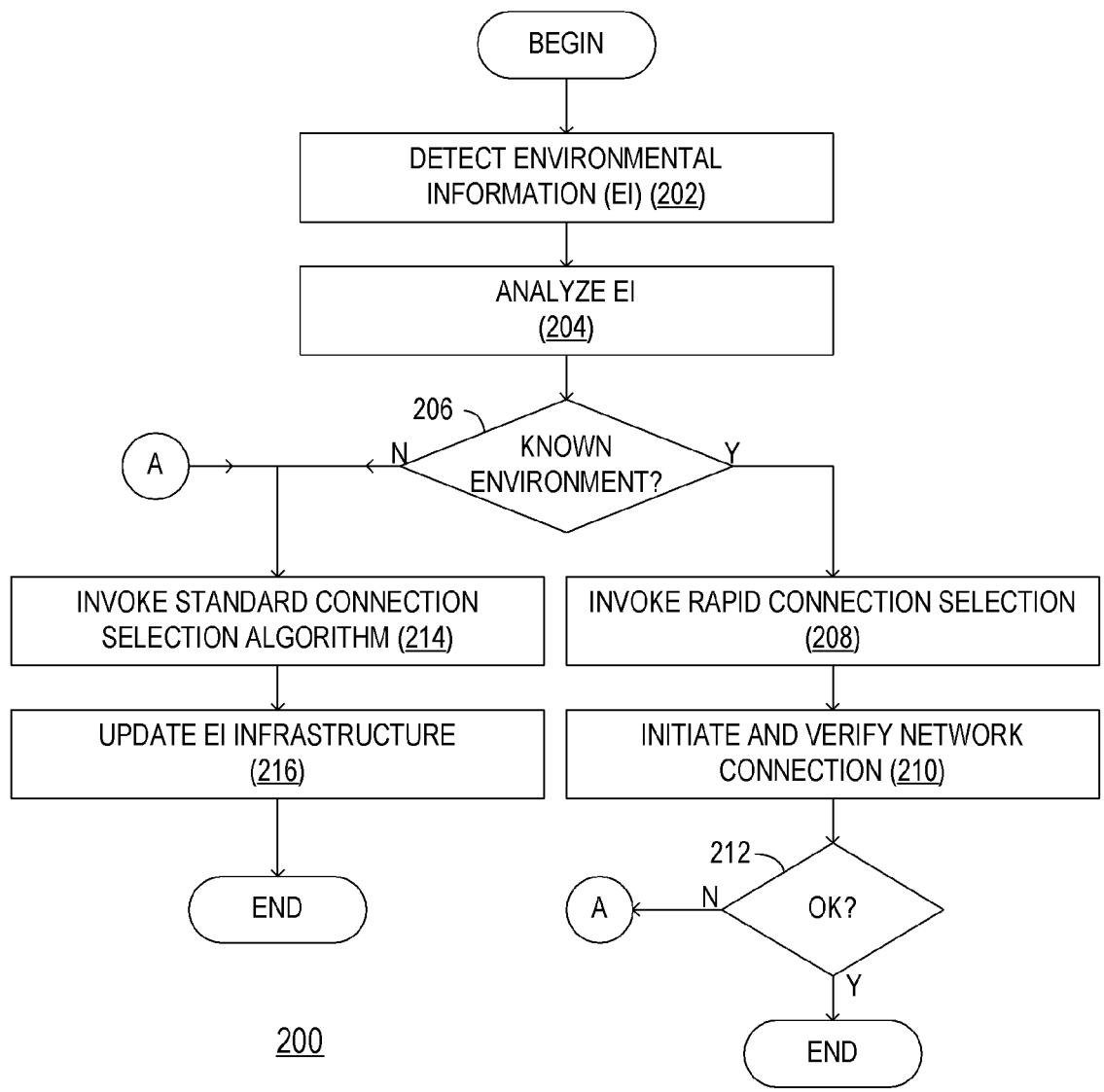
FIG. 2 is a flow diagram illustrating selected elements of one embodiment of a method of establishing a network connection.
FIG. 3 is a conceptual representation of an exemplary data structure suitable for use with the network connection selection method of FIG. 2.

Turning now to FIG. 2, a block diagram illustrating selected elements of a method 200 for selecting a network connection in a data processing system having multiple connections is presented. In the depicted embodiment, method 200 includes determining a current environment by detecting (block 202) environmental information. Method 200 may frequently be initiated upon a return to a normal operating state from some form of suspended state such as a powered down state or a standby state. Thus, for example, method 200 may be invoked in response to a power on or system resent event. In such situations, detecting environmental information in block 200 may include detecting the environmental information during a pre-OS (operating system) environment. For example, detecting of environmental information in block 202 may be implemented as part of a BIOS start up procedure, a power on self test (POST) procedure, or the like.

In some embodiments, the current environment refers to information that is indicative of external hardware to which the system is connected and timestamp information associated with the power on or system reset. Thus, the environmental information detected in block 202 may include timestamp information, the amount of time that has expired since last invoking method 200, and certain hardware configuration information. The timestamp information is preferably indicative of the time and date associated with then power on or system reset that trigerred execution of method 200. The hardware configuration information may include information that indicates, as an example, external hardware to which data processing system 100 is connected. The types of external hardware to which a laptop embodiment of data processing system 100 may be connected that are relevant in determining the best network connection include, as examples, docking stations, external keyboard, video, and mouse devices, external printers, and/or the presence of an external network adapter.

Having detected at least some environmental information that is preferably relevant to selecting the best network connection, method 200 further includes analyzing (block 204) the detected environmental information to determine (block 206) whether the currently detected environment is a recognized or known environment.

Analysis of the detected environmental data may include retrieving data from a network connection data structure exemplified by data structure 300 as depicted in FIG. 3. Data structure 300 preferably contains historical data indicative of previously detected environments and the network connections that were used in each of those detected environments. In the depicted embodiment, network connection data structure 300 includes a plurality of entries or records 302-1 through 302-*n*. Each record 302 represents a known environment and a corresponding network connection. In this embodiment, data structure 300 preferably includes a set of at least one known environments The known environments are reflected in a plurality of fields 304 through 312, each representing a corresponding piece of environmental data. Field 304, for example, indicates the time of day that the corresponding record 302 was created. Fields 306 through 312 of the depicted implementation, indicate, respectively, information about any docking station, external monitor, printer, and external network device that was detected in the corresponding environment. Each record 302 thus represents a known or previously detected environment or state as a particular combination of the environmental parameters represented by fields 304 through 312. In addition, each record 302 includes a network connection field 314 indicating a network connection that was used during when the data processing was operating in the environment represented by fields 304 through 312. Thus, data structure 300 contains a history of different environments in which a data processing system was operated and the network connections that were used to connect the system to a network in each of those environments. Although FIG. 3 depicts a specific implementation of data structure 300, details of data structure may vary among different implementations. Alternative implementations of data structure 300 may include, for example, more or fewer environmental parameters and may contain different environmental parameters than those illustrated. As an example, a data processing system may include a global positioning system (GPS) or other similar device for determining geographical position of the system. In such systems, geographical information may be obtained as part of the environmental data.

Returning to FIG. 2, the determination, represented in block 206, of whether the present environment is a known environment may include using the analysis of data structure 300 performed in block 204 to determine whether a currently detected environmental state matches a previously encountered or otherwise known environmental state and, if so, identifying the network connection that was used when the environmental state was previously encountered as the most likely candidate for the current network connection. However, the determination in block 206 of whether the current environmental state is a known state and, ultimately, the selection of the current network connection may be influenced by factors or parameters apart from those reflected in data structure 300. Recency information, as an example, may be used in combination with the information in data structure 300 to select a current connection. If, for example, method 200 is executing very close in time to a previous execution of method 200, a presumption that the connection used in the most recent instance is the most likely candidate for the current instance may be used to select the network connection or may alter the candidate identified by analyzing data structure 300.

Regardless of the specific details involved in the analysis of environmental information and the determination of whether the current environment is a known environment, method 200 as depicted in FIG. 2 includes invoking (block 208) a rapid connection selection module, if the current environment is determined to be a known environment, to rapidly establish a network connection. In one embodiment, for example, rapid selection includes identifying a network connection option corresponding to the matching known environment and establishing the network connection using the identified network connection option. The selection of a network connection in block 208 is referred to as a rapid selection because the rapid selection eliminates conventional selection procedures in which the various network connections are, for example, blindly evaluated in a predetermined order. In addition, the selection of network connection in block 208 is referred to as rapid because the determination and analysis of environmental information may require less time than the process of evaluating a sequence of network connections in conventional manner. In embodiments using data structures such as data structure 300, for example, the rapid selection of block 208 may include referring to data structure 300 to select the network connection corresponding to the entry 302 that matches the current environment, i.e., selecting the network connection corresponding to the known environment that matches the current environment.

Following rapid selection of a network connection, method 200 as depicted includes configuring and verifying (block 210) the network connection selected in block 208. If (block 212) the selected network connection is verified as a functional connection, method 200 terminates and normal user operation may proceed. If, however, the selected network connection cannot be verified as functional, method 200 jumps to block 214, in which traditional network connection selection algorithms are executed. Block 214 is also executed if method 200 determines in block 206 that the current environment is unknown because the current environment does not match to any environments reflected in data structure 300. Following execution of conventional network connection processing in block 214, method 200 includes updating the environmental data structure 300 to indicate the network connection that was resolved for the current environment so that a subsequent execution of method 200 will include the current environment and the corresponding network connection in its database.

It will be apparent to those skilled in the art having the benefit of this disclosure that the present invention encompasses a method and system for selecting one of a plurality of network connections. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of selecting a network connection for use with a data processing system, comprising:
   selecting a most recently used known environment when an amount of time elapsed since a last power on or system reset is less than a threshold;
   when the amount of time elapsed since the last power on or system reset is greater than the threshold:
      absent using network information, and based upon specified hardware elements attached and time of day information, detecting environmental information indicative of a current environment in which the data processing system is operating;
      determining whether the current environment is a known environment, including accessing a data structure containing historical network connection information, said historical information including records, wherein each record identifies an environment and a network connection used in conjunction with said environment;
      responsive to determining that the current environment is absent from said data structure invoking a standard network connection; and
      responsive to determining that the current environment is a known environment present in said data structure, establishing a specific network connection associated with the known environment.

2. The method of claim 1, wherein detecting the environmental information includes detecting whether specified hardware is present in the current environment, wherein the specified hardware is selected from a list of hardware consisting of a docking station, external monitor, and printer.

3. The method of claim 1, further comprising updating said data structure by adding a record associated with said current environment absent from said data structure and a corresponding network connection.

4. The method of claim 1, wherein said detecting the environmental information further includes determining a recency of a previous network connection.

5. The method of claim 1, wherein the data processing system is a laptop system and wherein selecting a current network connection includes selecting a network connection from a list of network connections consisting of a dial up modem connection, a wired network interface card (NIC) connection, a wireless connection, and a broadband connection.

6. A computer program product comprising computer executable instructions, stored on a non-transitory computer readable medium, to select a network connection for a data processing system having a plurality of network connection options, comprising:
  instructions to select a most recently used known environment when an amount of time elapsed since a last power on or system reset is less than a threshold;
  when the amount of time elapsed since the last power on or system reset is greater than the threshold:
    instructions to respond to a power on or system reset absent using network information by determining a current environment, based upon a combination of specified external hardware to which the system is connected and timestamp information associated with the power on or system reset;
    instructions to compare the current environment against a set of at least one known environment, wherein each of the known environments is associated with a corresponding network connection selected from the plurality of network connection options, including accessing a data structure containing historical network connection information, said historical information including records, wherein each record identifies an environment and a network connection used in conjunction with said environment;
    instructions to invoke a standard network connection when the current environment is absent from said data structure; and
    instructions to establish a network connection for the system when the current environment matches one of the known environments in said data structure, said connection associated with the known environment.

7. The computer program product of claim 6, further comprising instructions to update said data structure by adding a record associated with said current environment absent from said data structure and a corresponding network connection.

8. The computer program product of claim 7, wherein comparing the current environment comprises comparing current time of day information, current docking station information, current external monitor information, current printer information, and current external network device information against time of day information, docking station information, external monitor information, and printer information in an entry of the data structure.

9. The computer program product of claim 6, wherein said external hardware includes an external printer, an external monitor, and a docking station.

10. The computer program product of claim 6, further comprising instructions for establishing the network connection for the system when the current environment does not match any of the known environment by iteratively selecting one of the network connection options in a predetermined sequence and attempting to establish the network connection with the selected network connection option until the network connection is established.

11. The computer program product of claim 10, further comprising instructions for updating the set of known environments to include a new known environment corresponding to the current environment.

12. A data processing system, comprising:
  a processor;
  storage accessible to the processor; and
  instructions, executable by said processor and stored in said storage, for selecting a network connection for a data processing system having a plurality of network connection options, said instructions comprising:
    instructions for selecting a most recently used known environment when an amount of time elapsed since a last power on or system reset is less than a threshold;
    when the amount of time elapsed since the last power on or system reset is greater than the threshold:
      instructions to respond to a power on or system reset, absent using network information, by determining a current environment, based upon specified external hardware to which the system is connected and time and date information associated with the power on or system reset;
      instructions for comparing the current environment against a set of at least one known environment, wherein each of the known environments is associated with a corresponding network connection selected from the plurality of network connection options, including accessing a data structure containing historical network connection information, said historical information including a plurality of records, wherein each record identifies an environmental state and a network connection used in conjunction with said environmental state;
      instructions to invoke a standard network connection when the current environment is absent from said data structure; and
      instructions for establishing a network connection for the system when the current environment matches one of the known environments in said data structure, said connection associated with the known environment.

13. The system of claim 12, further comprising instructions for updating said data structure by adding a record associated with said environment absent from said data structure and a corresponding network connection.

14. The system of claim 13, wherein comparing the current environment comprises comparing current time of day information, current docking station information, current external monitor information, current printer information, and the current external network device information against time of day information, docking station information, external monitor information, and printer information in each entry.

15. The system of claim 12, wherein said external hardware includes an external printer, an external monitor, and a docking station.

16. The system of claim 12, further comprising instructions for establishing the network connection for the system when the current environment does not match any of the known environment by iteratively selecting one of the network connection options in a predetermined sequence and attempting to establish the network connection with the selected network connection option until the network connection is established.

* * * * *